US006727478B2

(12) United States Patent
Rael et al.

(10) Patent No.: US 6,727,478 B2
(45) Date of Patent: Apr. 27, 2004

(54) MULTI RACK OVEN AND METHODS FOR OPERATING SAME

(75) Inventors: Jennifer Elizabeth Rael, Louisville, KY (US); Coleen Judith Muegge, Louisville, KY (US); Peta-Gaye Sonya Whitbourne, Louisville, KY (US); Charles Ray Smith, Shelbyville, KY (US); David Laurence Kinny, Louisville, KY (US)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 10/068,026

(22) Filed: Feb. 5, 2002

(65) Prior Publication Data

US 2003/0146205 A1 Aug. 7, 2003

(51) Int. Cl.[7] .......................... F24C 15/16; A21B 1/26; A21B 1/40; A21B 1/50

(52) U.S. Cl. ...................... 219/506; 219/392; 219/395; 219/413; 219/492; 126/337 R; 126/337 A; 126/21 A

(58) Field of Search ................................ 219/506, 392, 219/395, 398, 400, 412, 413, 490, 492, 494; 126/21 A, 337 R, 337 A, 332, 339; 99/332, 474–476

(56) References Cited

U.S. PATENT DOCUMENTS 1,923,145 A 8/1933 Harsch
3,620,520 A 11/1971 Ross et al.
3,802,832 A 4/1974 Nicolaus
3,861,378 A 1/1975 Rhoads et al.
3,991,737 A 11/1976 Del Fabbro
4,029,463 A * 6/1977 Johansson et al. .......... 219/400
4,467,777 A 8/1984 Weber
4,587,946 A * 5/1986 Doyon et al. ............... 219/400
4,671,250 A 6/1987 Hurley et al.
4,771,163 A * 9/1988 Thiboutot .................. 219/400
4,817,509 A 4/1989 Erickson
4,867,132 A 9/1989 Yencha
4,920,948 A 5/1990 Koether et al.
5,111,028 A * 5/1992 Lee ............................ 219/506
5,121,737 A 6/1992 Yencha, III
5,222,474 A 6/1993 Yencha, III
5,394,791 A * 3/1995 Vallee .......................... 99/476
5,403,607 A 4/1995 Erickson et al.
5,466,912 A 11/1995 Dornbush et al.
5,484,621 A 1/1996 Erickson et al.
5,513,558 A 5/1996 Erickson et al.
5,864,120 A * 1/1999 Vroom et al. ............... 219/400
6,140,626 A 10/2000 McKee et al.
6,346,691 B2 2/2002 Kim et al.

FOREIGN PATENT DOCUMENTS

JP 6-229559 * 8/1994

* cited by examiner

*Primary Examiner*—Joseph Pelham
(74) *Attorney, Agent, or Firm*—H. Neil Houser, Esq.; Armstrong Teasdale LLP

(57) ABSTRACT

An oven includes an oven cavity, at least one heat source disposed in the cavity, and an oven controller operationally coupled to the heat source. The oven controller is configured to accept data regarding a number of racks and control the at least one heat source based upon the accepted data.

17 Claims, 12 Drawing Sheets

| User Selection | Description | Element Cycling | | | |
|---|---|---|---|---|---|
| | | Temp Range | Element | Cycling | Ton/Toff |
| Convection-MultiRack | Cook more than one rack of food at a time | 170F-550F | Convection | 60 Conv On 0 Off | Set Temp -15F/+15F |
| onvection-Single Rack | Cook one rack of food at a time | 170F-550F | Bake&Broil | 45 Bake On 15 Broil On | Set Temp -5F/+5F |
| onvection Roast | Roast/cook 1 rack of meat items | 170F-550F | Broil | 60 Broil 0 Off | Set Temp -15F/+15F |
| Dehydrate | Dehydrate 1 or more racks of food | 100F-200F | Convection | 60 Conv On 0 Off | Set Temp -15F/+15F |
| Proof | Proof bread dough | Oven Light On (Uses no heating elements) | | | |

| Fan Cycling | | | |
|---|---|---|---|
| CW On | Off Time | CCW On | Off Time |
| 20 Seconds | 10 Seconds | 40 Seconds | 10 Seconds |
| 3 Minutes | 10 Seconds | 3 Minutes | 10 Seconds |
| N/A | N/A | Continuous | N/A |
| N/A | N/A | Continuous | N/A |
| 1 Minute | 10 Minutes | 1 Minute | 10 Minutes |

FIG. 8

MULTI RACK OVEN AND METHODS FOR OPERATING SAME

BACKGROUND OF THE INVENTION

This invention relates generally to cooking appliances, and more specifically to ovens.

Many known ovens include a fan for circulating air within the oven. For example, a typical convection oven includes a convection fan which operates in a single direction to circulate air within the oven during convection cooking. Such air circulation facilitates cooking by causing air to flow over, and to be heated by, the convection cooking element.

Cooking with such one directional fans, however, may result in uneven cooking. Specifically, the air flow path within an oven cooking cavity typically is not dynamic, i.e., does not change during cooking. For example, the fan is securely fixed to a wall of the cooking cavity and hot air from the cooking element typically is directed along a same flow path. As a result, the relative position of food within the cooking cavity with respect to the flow path impacts the evenness of cooking. For example, if a portion of the food is directly in the flow path of air from the convection fan, such food portion may cook more quickly than another portion of the food that is not in the direct air flow path. Uneven cooking can cause variation in browning and a darkening around the edges in baked products.

At least one known oven includes a plurality of fans and by reversing rotation of the fans, the air flow pattern within the oven cooking cavity is altered. Requiring multiple fans, including multiple fan motors for driving the fans, increases the cost of the ovens and may be cost prohibitive.

BRIEF DESCRIPTION OF THE INVENTION

In one aspect, an oven includes an oven cavity, at least one heat source for supplying energy to the cavity, and an oven controller operationally coupled to the heat source. The oven controller is configured to accept data regarding a number of racks, and control the at least one heat source based upon the accepted data.

In another aspect, an oven includes an oven cavity, at least one heat source for supplying energy to the cavity, and at least one fan assembly for circulating air in the cavity. The fan assembly includes a fan motor, a shaft extending from the motor, and a fan coupled to the shaft. The oven also includes an oven controller operationally coupled to the fan motor. The oven controller is configured to energize the fan motor during a cook cycle, de-energize the fan motor during the cook cycle, and re-energize the fan motor during the cook cycle.

In a still further aspect, a method for controlling at least one heat source of an oven is provided. The method includes receiving data regarding a number of racks and controlling the at least one heat source based upon the received data.

BRIEF DESCRIPTION OF THE DRAWINGS

FIG. 8 illustrates an exemplary control algorithm for the oven shown in FIG. 1.

DETAILED DESCRIPTION OF THE INVENTION

Figure 1:
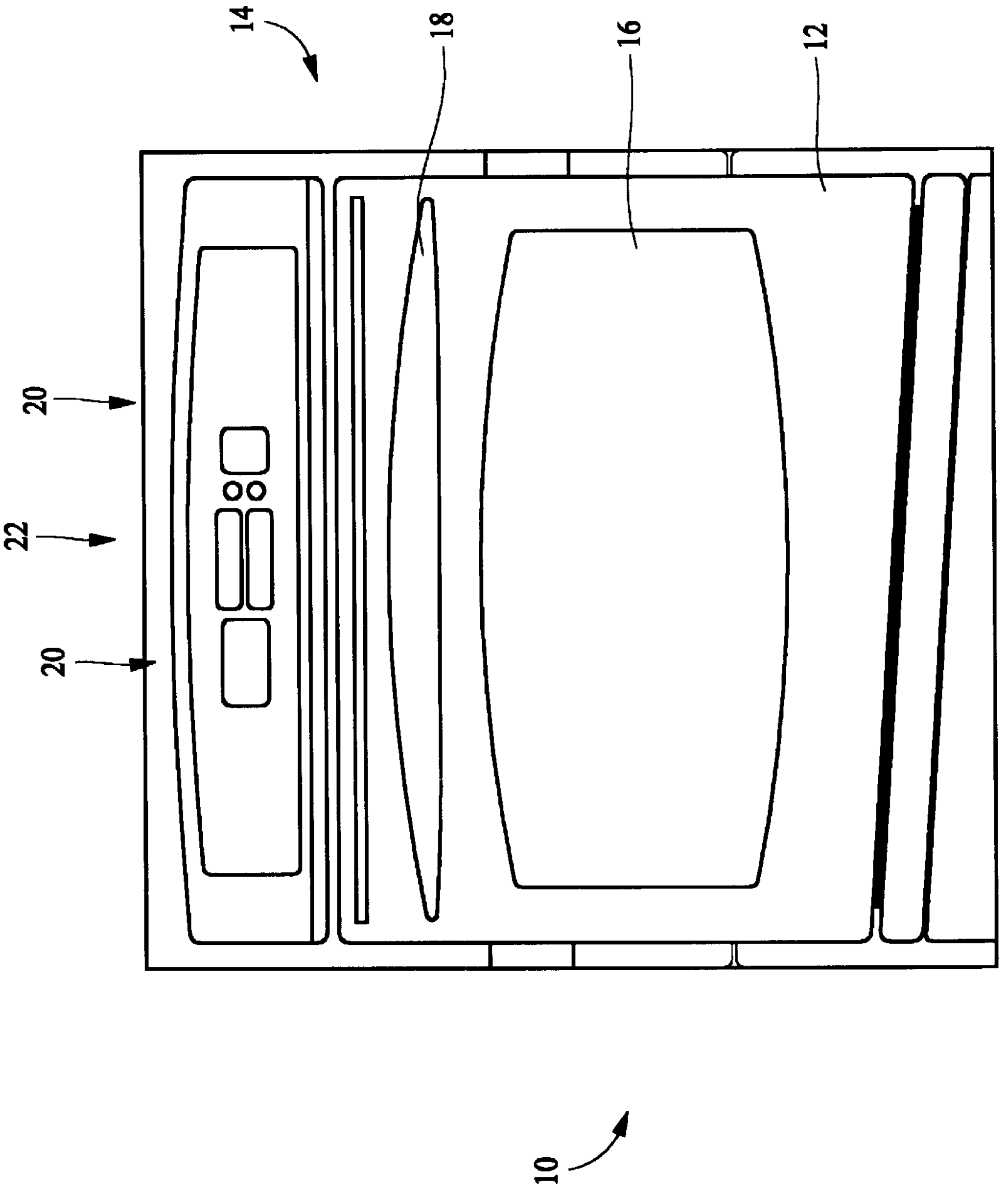
FIG. 1 is a front view of an oven.

FIG. 1 is a front view of an oven 10 including a door 12 and an oven control user interface 14. Door 12 includes a window 16 and a handle 18. Oven control user interface 14 includes a plurality of input devices 20 and a display 22, which are described in greater detail below. Oven 10 is illustrated as a built-in wall oven. The oven control described herein, however, can be utilized in connection with many other types of ovens such as free-standing ovens, drop-in ovens, slide ovens, and speed cooking ovens. In one embodiment, oven 10 is a convection microwave oven. Generally, the control described herein can be used in connection with any convection oven that includes a convection fan. Such ovens are commercially available from the GE Appliances business of General Electric Company, Louisville, Ky.

Figure 2:
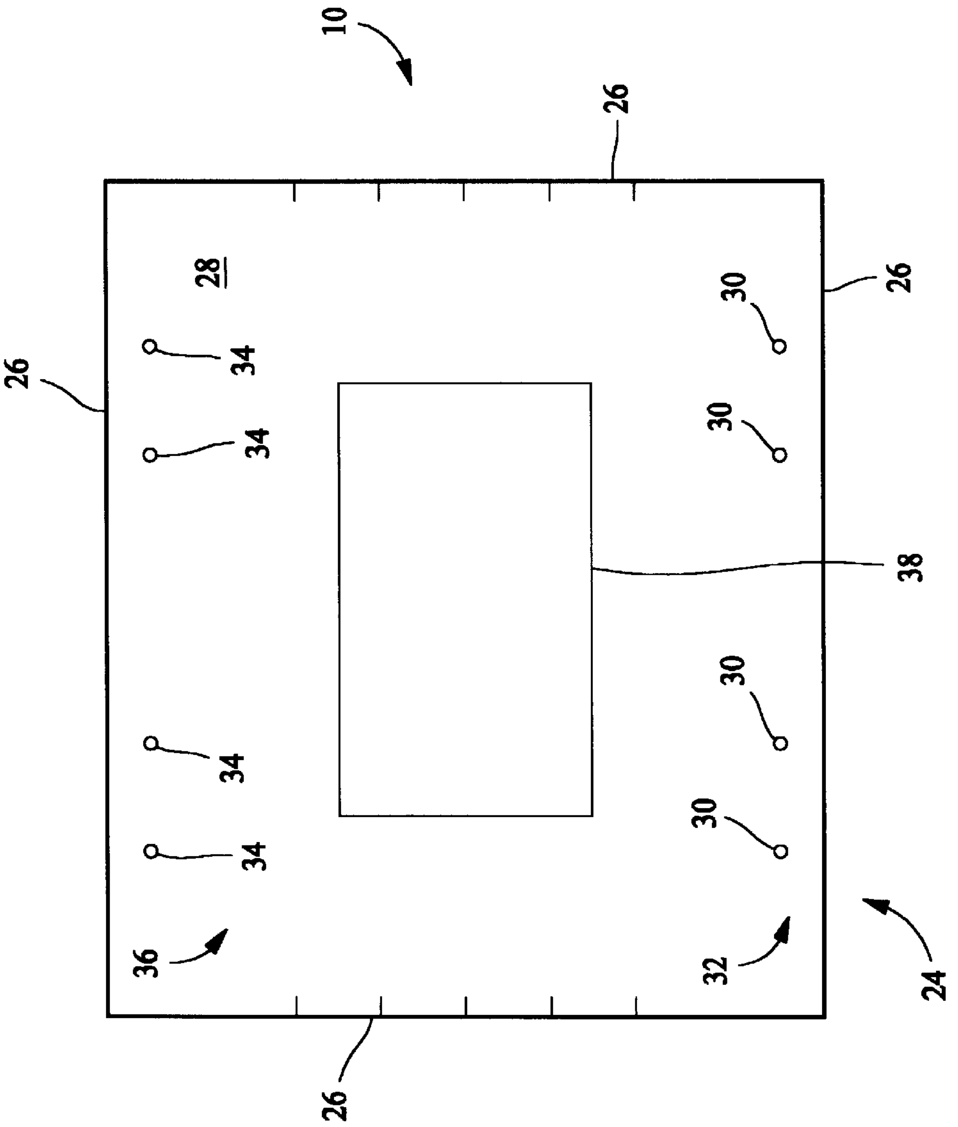
FIG. 2 is a cut away view of the oven shown in FIG. 1.

FIG. 2 is a cut away view of oven 10 illustrating in schematic form a portion of an oven cavity 24 formed by a plurality of oven walls 26, a back wall 28, and door 12 (shown in FIG. 1). A plurality of heating segments 30 form a baking element 32 (a heat source) and a plurality of heating segments 34 form a broiling element 36 (a heat source). A convection assembly 38 is mounted on back wall 28 of oven 10. In an exemplary embodiment, broiling element 36 is a 3600 watt (W) element and baking element 32 is a 2800 W element.

Figure 3:
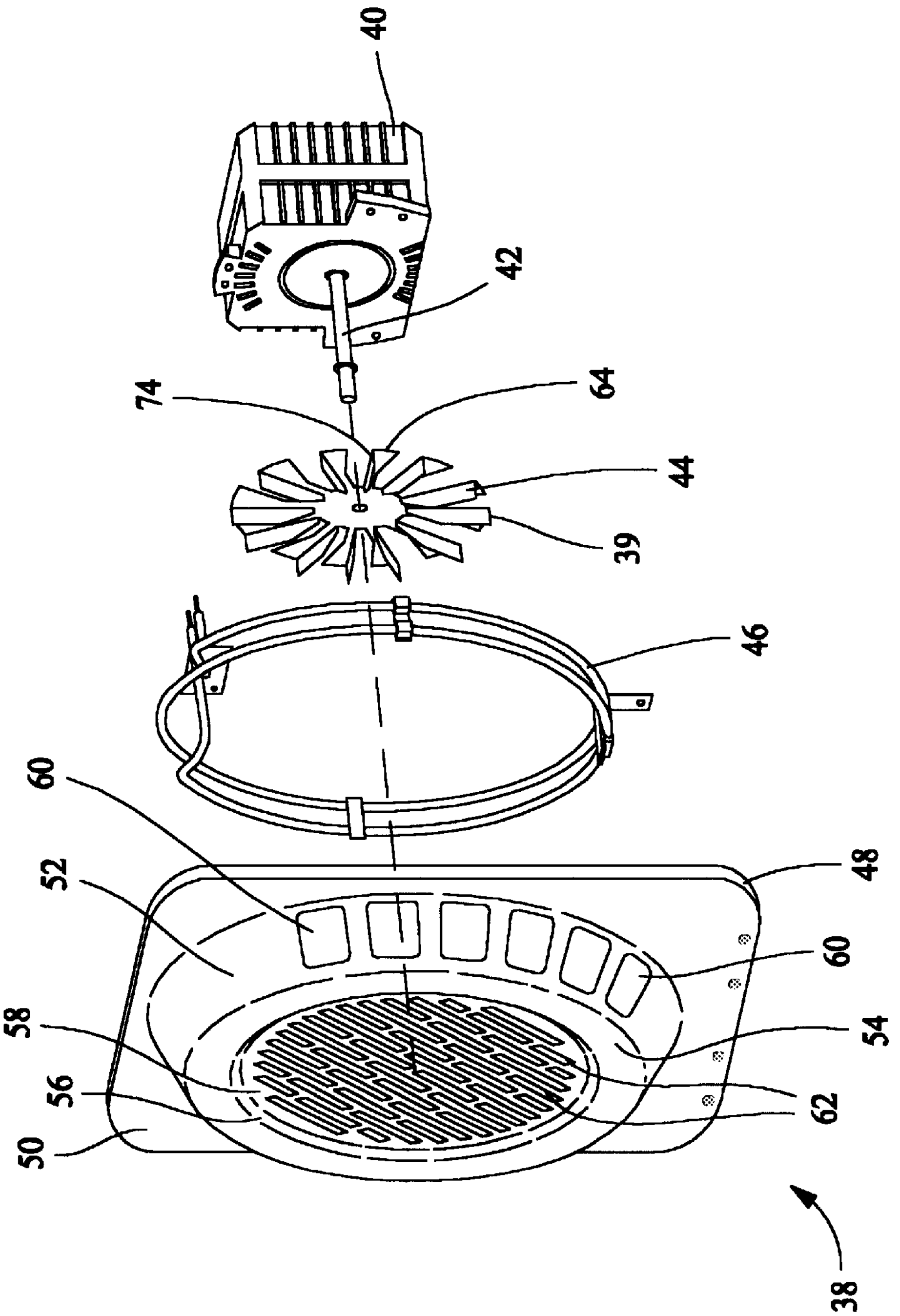
FIG. 3 is an exploded view of the convection assembly shown in FIG. 2.

FIG. 3 is an exploded view of convection assembly 38. Convection assembly 38 includes a fan assembly 39. Fan assembly 39 includes a motor 40 including a shaft 42 extending from motor 40, and a fan 44 mounted to shaft 42. Convection assembly 38 also includes a convection element 46 (a heat source) and a cover member 48. In an exemplary embodiment, convection element 46 is a 2500 W element. In an alternative embodiment, convection assembly 38 does not include a convection element 46 and oven 10 is a pseudo-convection oven. Cover member 48 includes a base portion 50 and a wall portion 52 extending obliquely radially inward from base portion 50 to a rim portion 54. Rim portion 54 extends substantially planer to an inner wall portion 56 which extends obliquely radially inward toward base portion 50 to a substantially planer face portion 58. Wall portion 52 includes a plurality of openings 60. In one embodiment, openings 60 are substantially rectangular shaped. Rather than being rectangular shaped, openings 60 can have many other different geometric shapes such as circular. Face portion 58 includes a plurality of elongated openings 62. Selected openings 60 can be partially or completely covered to allow for a tailoring or tuning of air flow within the cooking cavity.

Motor 40 is mounted to an oven rear wall such that shaft 42 extends through an opening in rear cavity wall 28 and into cavity 24 (shown in FIG. 2). Fan 44 is mounted to shaft 42 such that fan 44 is positioned within cavity 24. Convection element 46 is mounted to rear cavity wall 28 and connected to an energy source (not shown). In the example embodiment, convection element 46 extends circumferentially around fan 44. Cover member 48 is attached to back wall 28 and shields convection element 46 and fan 44.

In an example embodiment, motor 40 is a permanent split capacitor (PSC) motor. Motor 40 is reversible in that motor 40 can alternately drive fan 44 in a clockwise and in a counter-clockwise direction. PSC motors are commercially available, such as from Plaset S.p.A., 10024 Moncalieri (TO), Italy. In the example embodiment, motor 40 is a two pole PSC motor and is configured to rotate shaft 42 at speeds up to 3600 revolutions per minute (rpm's) in both a clockwise direction and a counter-clockwise direction, and has a 6 $\mu$Farads (F) capacitor. In an alternate embodiment, motor 40 is a reversible motor other than a PSC motor.

Figure 4:
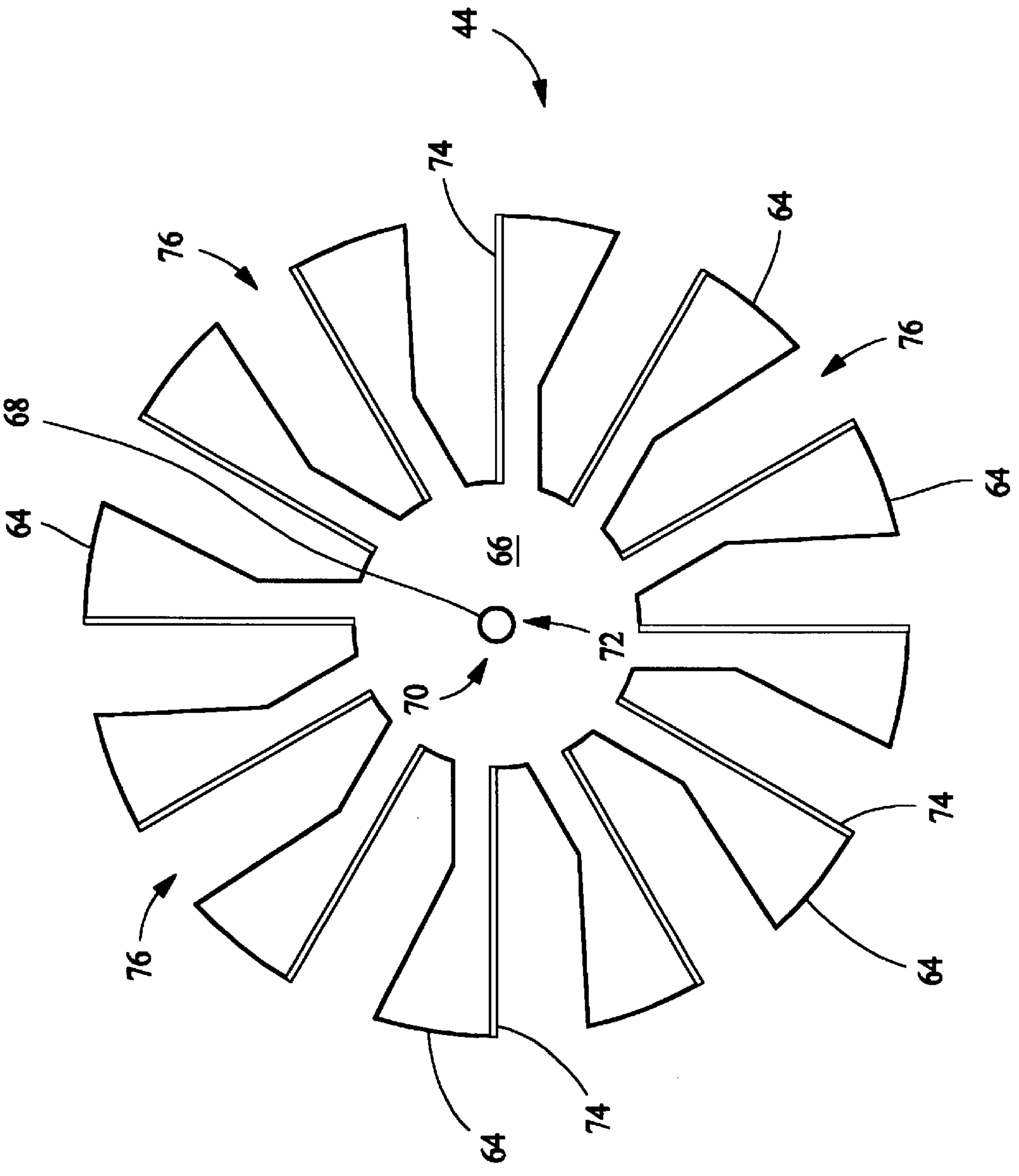
FIG. 4 is a top view of the fan shown in FIG. 3.

FIG. 4 is a front view of fan 44 including a plurality of radially extending portions 64 extending from a circular central section 66. Central section 66 includes an opening 68 having a flat portion 70 and an arcuate portion 72 facilitating keying fan 44 with shaft 42. Each radially extending portion 64 includes a fan blade 74 that extends radially outward, is substantially planar, and pushes air when fan 44 is rotated.

Figure 5:
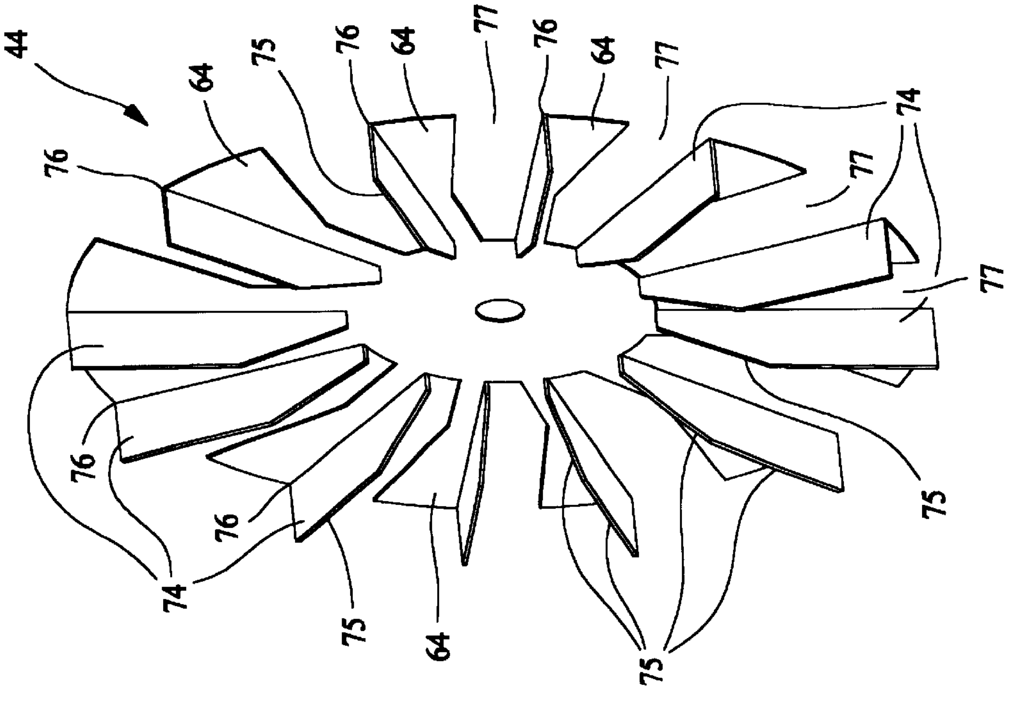
FIG. 5 is a perspective view of the fan shown in FIG. 4.

FIG. 5 is a perspective view of fan 44. Each fan blade 74 includes an outer edge 75. In an exemplary embodiment, fan 44 is fabricated from a single piece of sheet steel. Outer edges 75 are cut from the single piece of sheet steel and portions of the single sheet of steel are folded along a line 76 to form fan blades 74, radially extending portions 64, and a plurality of voids 77.

Figure 6:
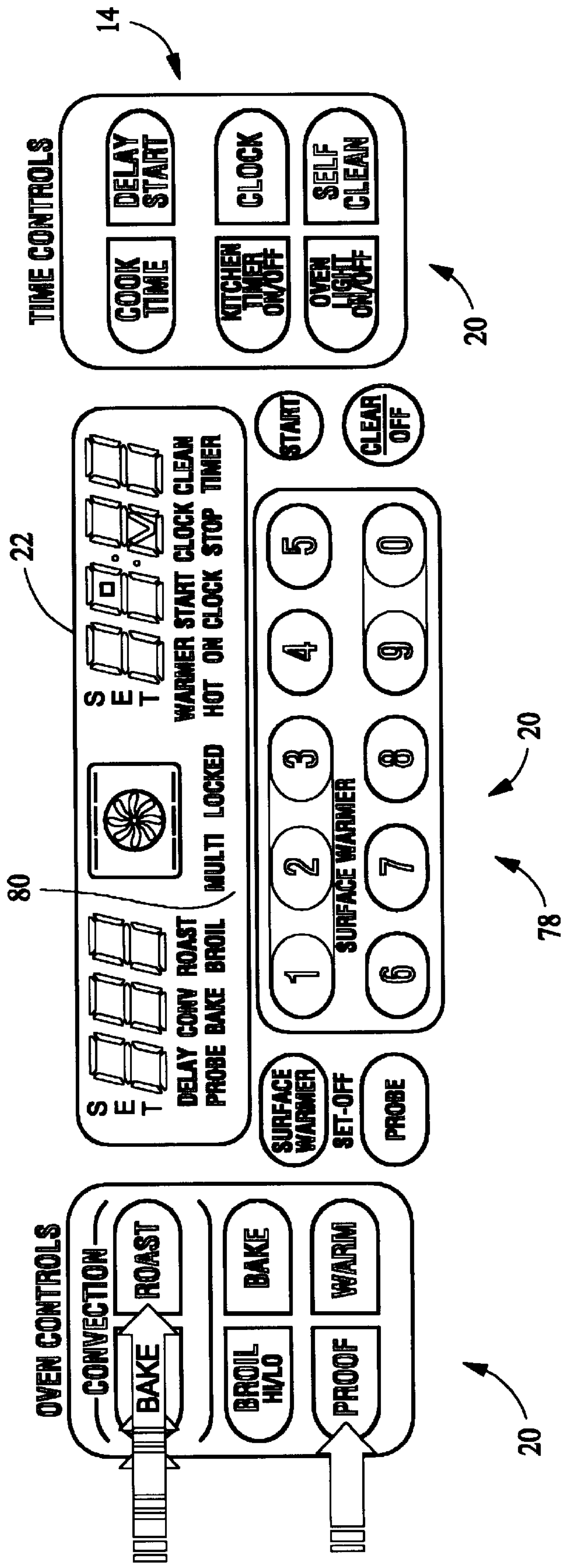
FIG. 6 is a front view of the oven control user interface shown in FIG. 1.

FIG. 6 is a front view of oven control user interface 14. Various touch sensitive pads 20 allow a user to select various cooking parameters such as convection roast and convection bake. The user can also select non-convection settings such as bake, broil, proof, and warm. Additionally, the user can use a numeric keypad 78 to enter numerical data relating to temperature, cook time, clock time, and kitchen timer. Display 22 includes a multi light 80. When the user selects convection bake a first time, multi light 80 is illuminated indicating that oven 10 is in multiple rack mode as explained in detail below. When the user selects convection bake a second time, multi light 80 is not illuminated indicating that oven 10 is in single rack mode as explained below.

The user can toggle between single rack mode and multiple rack mode. In an alternative embodiment, and rather than relying on user input regarding selection of the number of racks on which food is located, at least one sensor senses whether one rack or multiple racks (e.g., by pressure or weight on a rack, or by sensing the presence of baking ware) are being used and provides an indication of rack mode to an oven controller automatically. Additionally, multiple rack mode need not be the first mode. For example, when the user selects convection bake a first time, multi light 80 is not illuminated indicating that oven 10 is in single rack mode, and when the user selects convection bake a second time, multi light 80 is illuminated indicating that oven 10 is in multiple rack mode.

Figure 7:
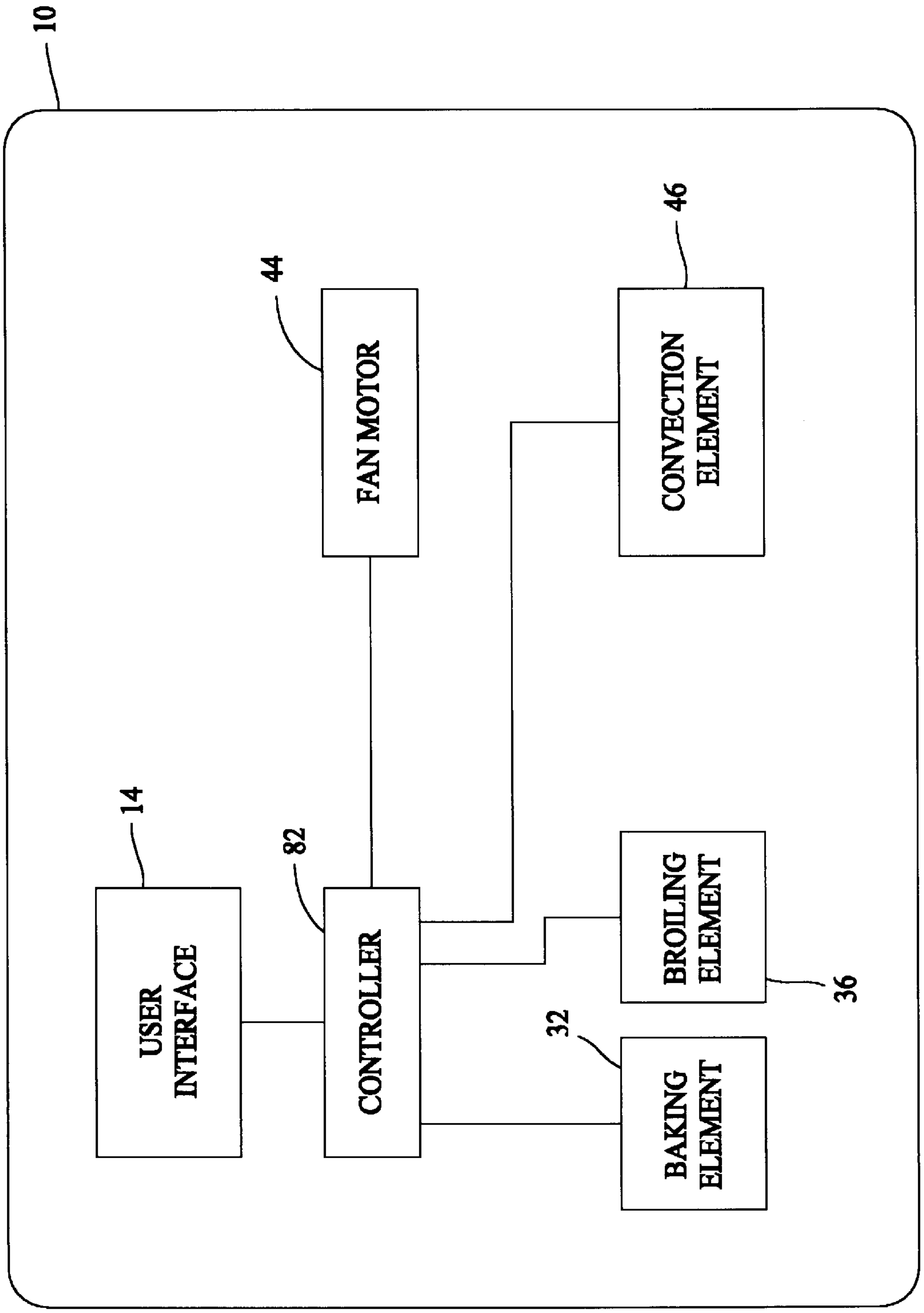
FIG. 7 is a block diagram of an oven.

FIG. 7 is a block diagram of oven 10 including an oven controller 82. Oven controller 82 is electrically connected to oven control user interface 14 and fan 44. In addition, oven controller 82 is electrically connected to baking element 32, broiling element 36, and convection element 46. Oven controller 82 receives inputs from oven control user interface 14 and controls fan 44, baking element 32, broiling element 36, and convection element 46 as described herein.

FIG. 8 illustrates an exemplary algorithm for controlling operation of the oven 10 in response to various user selections. For example, when convection bake is selected in multiple rack mode as explained above, and a temperature between 170 degrees Fahrenheit (F.) and 550° F. is selected, fan 44 is rotated clockwise for twenty seconds and then de-energized for ten seconds before being energized in the counter clockwise direction for forty seconds. Fan 44 is then de-energized for ten seconds and then re-energized for twenty seconds in the clockwise direction starting the cycling over again. In addition to cycling fan 44, convection heating element 46 is cycled on for periods of time equal to integral minutes (i.e., X minutes where X in an integer). For example, the temperature within cavity 24 is measured continuously and when the temperature is about 15° below (or less than 15° below) the temperature set by the user, heating element 46 is energized supplying heat to cavity 24. The temperature continues to be measured and when the temperature in cavity 24 is about 15° above (or greater than 15° above) the user specified temperature, heating element 46 is de-energized. The cycling of fan 44 is independent of the temperature of cavity 24. Although the illustrated embodiment uses a 15° temperature range which has been empirically derived to provide satisfactory cooking results, other temperature ranges are also useful, and accordingly, in other embodiments, a range other than 15° is used.

Additionally, when convection bake is selected in single rack mode as explained above, and a temperature between 170° F. and 550° F. is selected, fan 44 is rotated clockwise for three minutes and then de-energized for ten seconds before being energized in the counter clockwise direction for three minutes. Fan 44 is then de-energized for ten seconds and then re-energized for three minutes in the clockwise direction starting the cycling over again. In addition to cycling fan 44, bake element 32 and broil element 36 are cycled on for periods of time equal to integral minutes. For example, the temperature within cavity 24 is measured and when the temperature is about 5° below (or less than 5° below) the temperature set by the user, bake element 32 and broil element 36 are energized supplying heat to cavity 24. More specifically, bake element 32 is energized for the first 45 seconds of each minute and broil element 36 is energized for the last fifteen seconds of each minute. When bake element 32 is energized, broil element 36 is de-energized, and when broil element 36 is energized, bake element 32 is de-energized. The temperature continues to be measured and when the temperature in cavity 24 is about 5° above (or greater than 5° above) the user specified temperature, bake element 32 and broil element 36 are de-energized. Although the illustrated embodiment uses a 5° temperature range which has been empirically derived to provide satisfactory cooking results, other temperature ranges are also useful, and accordingly, in other embodiments, a range other than 5° is used. Additionally, while an approximate five degree range is maintained when the selected mode is single rack, an approximate fifteen degree range is maintained when the selected mode is multiple rack. The different degree ranges facilitate an even cooking in both rack modes.

When convection roast is selected, fan 44 rotates counter clockwise continuously. Fan 44 also rotates continuously counter clockwise when a dehydrate mode is selected. When a proof mode is selected all heating sources 32, 36, and 46 are kept de-energized and an oven light (not shown) inside cavity 24 is illuminated. Additionally, in the proof mode, fan 44 is rotated clockwise for one minute and then fan 44 is de-energized for ten minutes. Fan 44 is then energized in the counter clockwise direction before being de-energized for ten minutes before the cycle starts over again.

Figure 9:
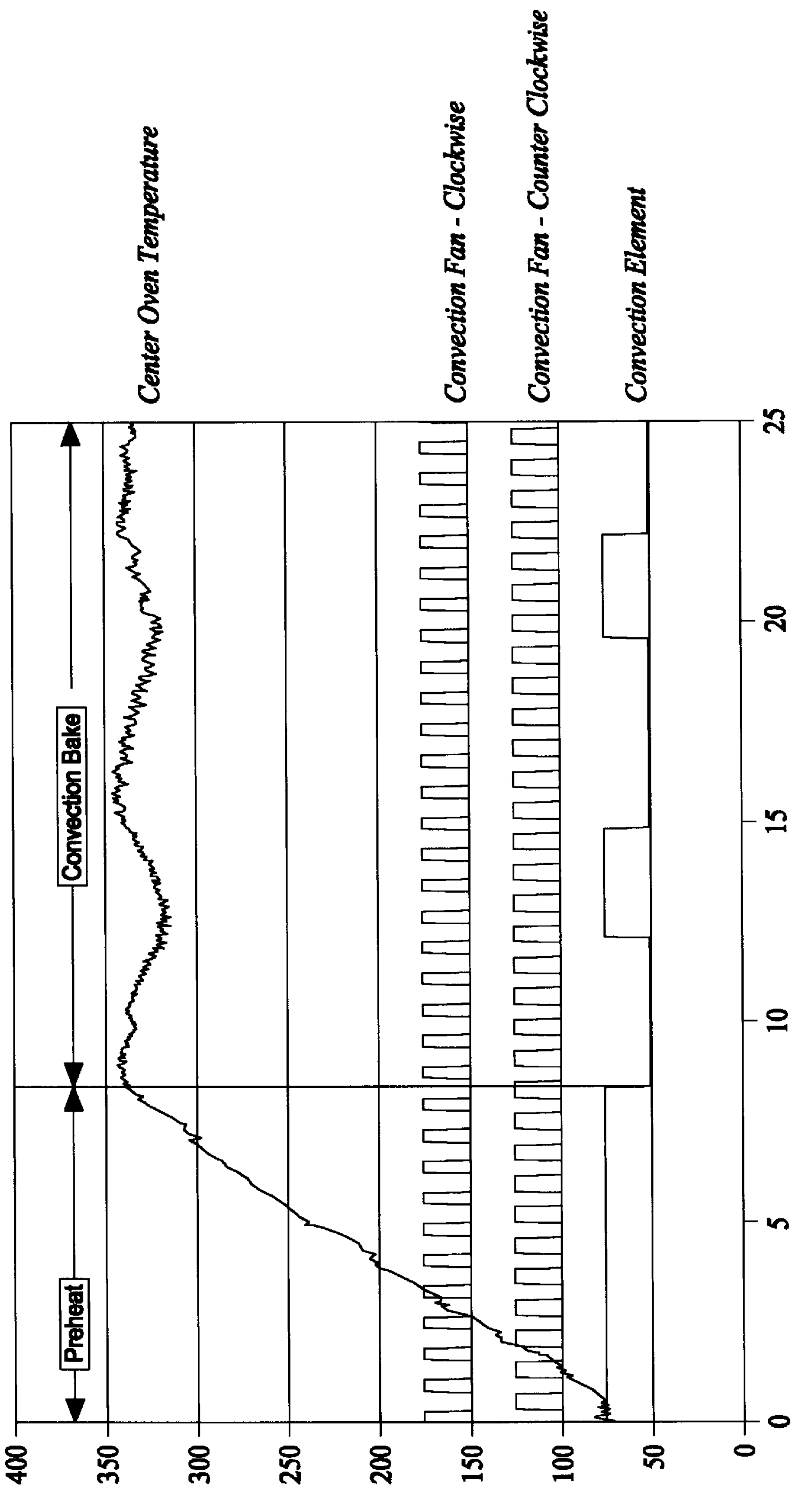
FIG. 9 illustrates the cycling of the oven shown in FIG. 1 in a convection bake multiple rack mode.

FIG. 9 illustrates the cycling of oven 10 in convection bake multiple rack mode. Convection heating element 46 is energized until cavity 24 reaches about 15° above the desired temperature (325 F.). Convection heating element 46 is de-energized until the temperature falls to about 15° below the desired temperature, at which point heating element 46 is energized again until the temperature is about 15° above the desired temperature. Fan 44 is cycled independent of heating element 46. The cycling of fan 44 facilitates an evenness of cooking in oven 10.

Figure 11:
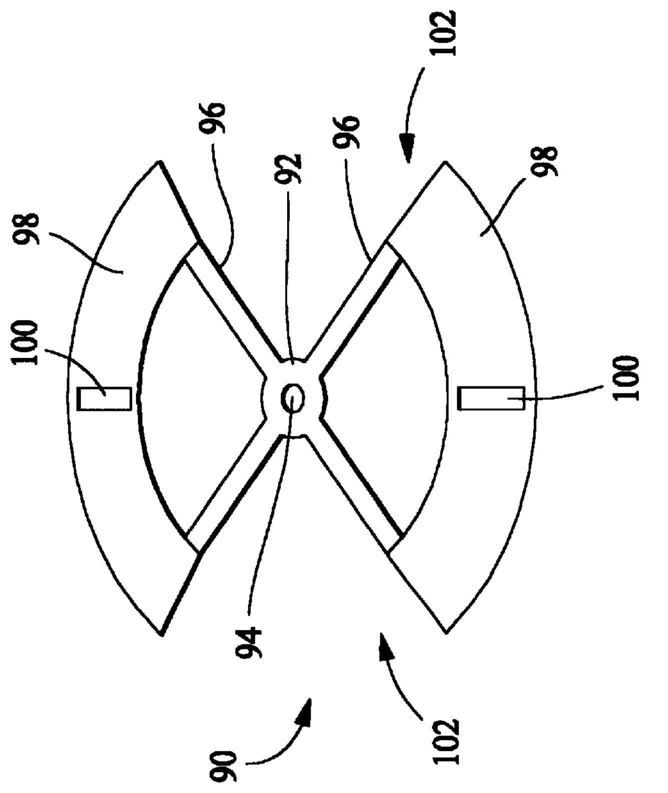
FIG. 11 is a plan view of the blocking fan shown in FIG. 10.
Figure 10:
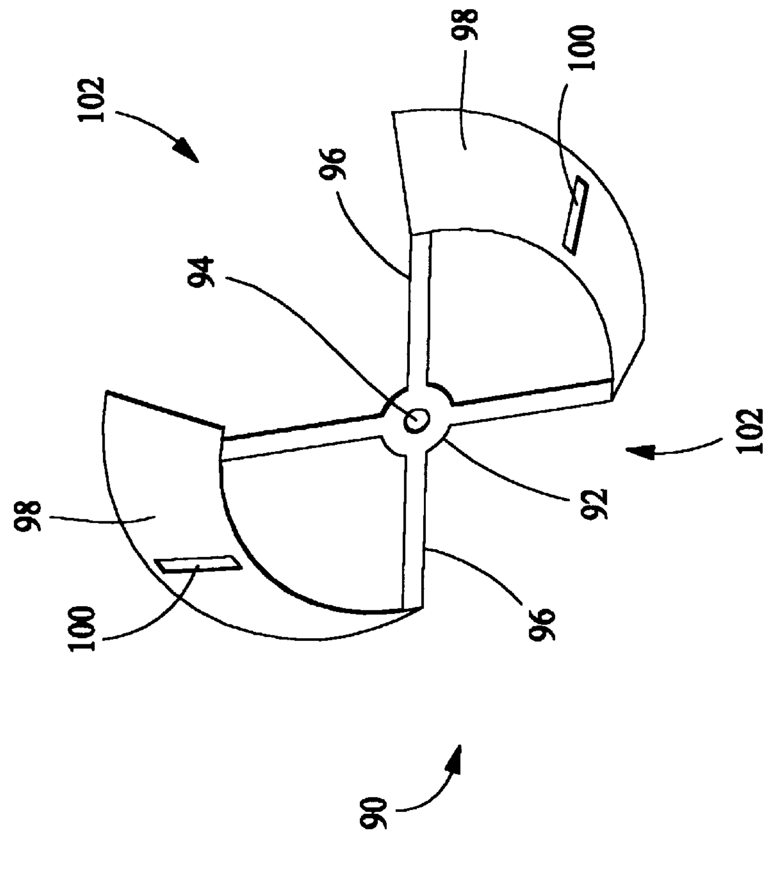
FIG. 10 is a perspective view of a blocking fan.

FIG. 10 is a perspective view and FIG. 11 is a plan view of a blocking fan 90 including a generally circular middle portion 92 including a mounting hole 94. A plurality of support members 96 extend radially from middle portion 92 to a plurality of arcuate fan sections 98. Each fan section 98 extends from one support member 96 to another support member 96 and includes a centrally positioned opening 100. Between each fan section 98 is an open section 102 such that open sections 102 alternate with fan sections 98. Fan sections 98 extend both radially and axially away from middle portion 92. Fan sections 98 are also arcuate circumferentially.

Blocking fan 90 is positioned within cavity 24 and separate from fan 44. More particularly, blocking fan 90 is rotatably mounted such that blocking fan 90 is aerodynamically coupled with fan 44. Blocking fan 90 is not connected to a motor, rather blocking fan 90 is positioned such that when fan 44 rotates causing an air flow within cavity 24, the air flow caused by fan 44 causes blocking fan 90 to rotate and create dynamically changing air flow patterns within cavity 24. In an exemplary embodiment, blocking fan 90 is positioned such that mounting hole 94 is axially aligned (but not connected) with shaft 42. The size of openings 100 and open sections 102 can be varied to create different dynamically changing air patterns.

During operation of fan 44 in a single direction or any single direction fan, blocking fan 90 rotates in the same direction as fan 44 but at a lower speed than fan 44. In an alternate embodiment, blocking fan 90 rotates in a direction opposite of fan 44. Because blocking fan 90 has fan sections 98 and open sections 102, blocking fan 90 blocks off different portions of the air flow generated by fan 44 as blocking fan 90 rotates to dynamically change the air flow inside cavity 24. This dynamic changing of the airflow within cavity 24 facilitates an evenness of cooking with oven 10.

Figure 12:
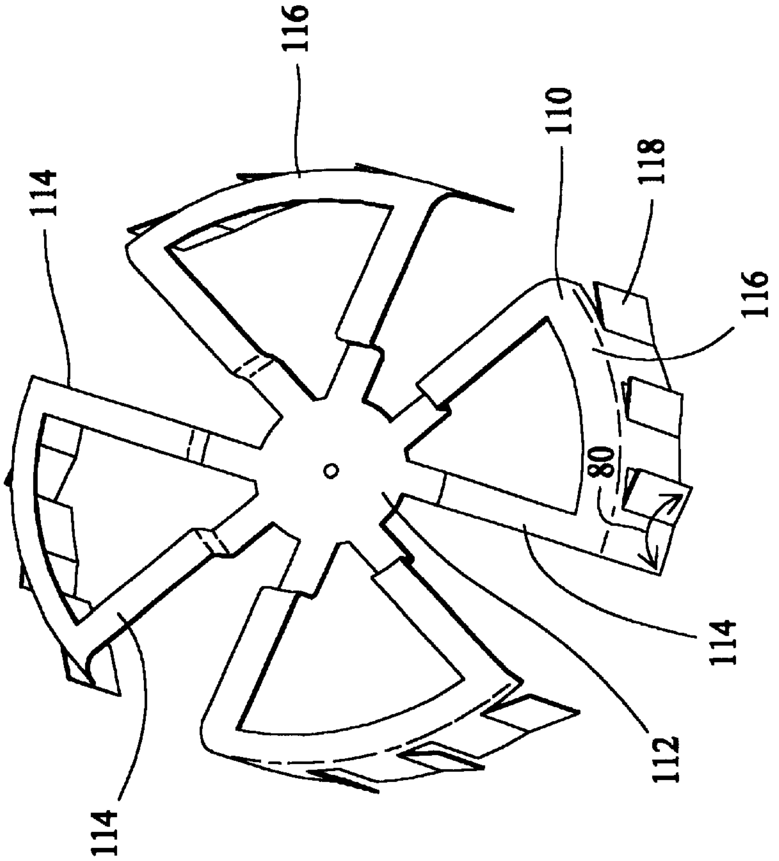
FIG. 12 is a perspective view of a blocking fan.
Figure 13:
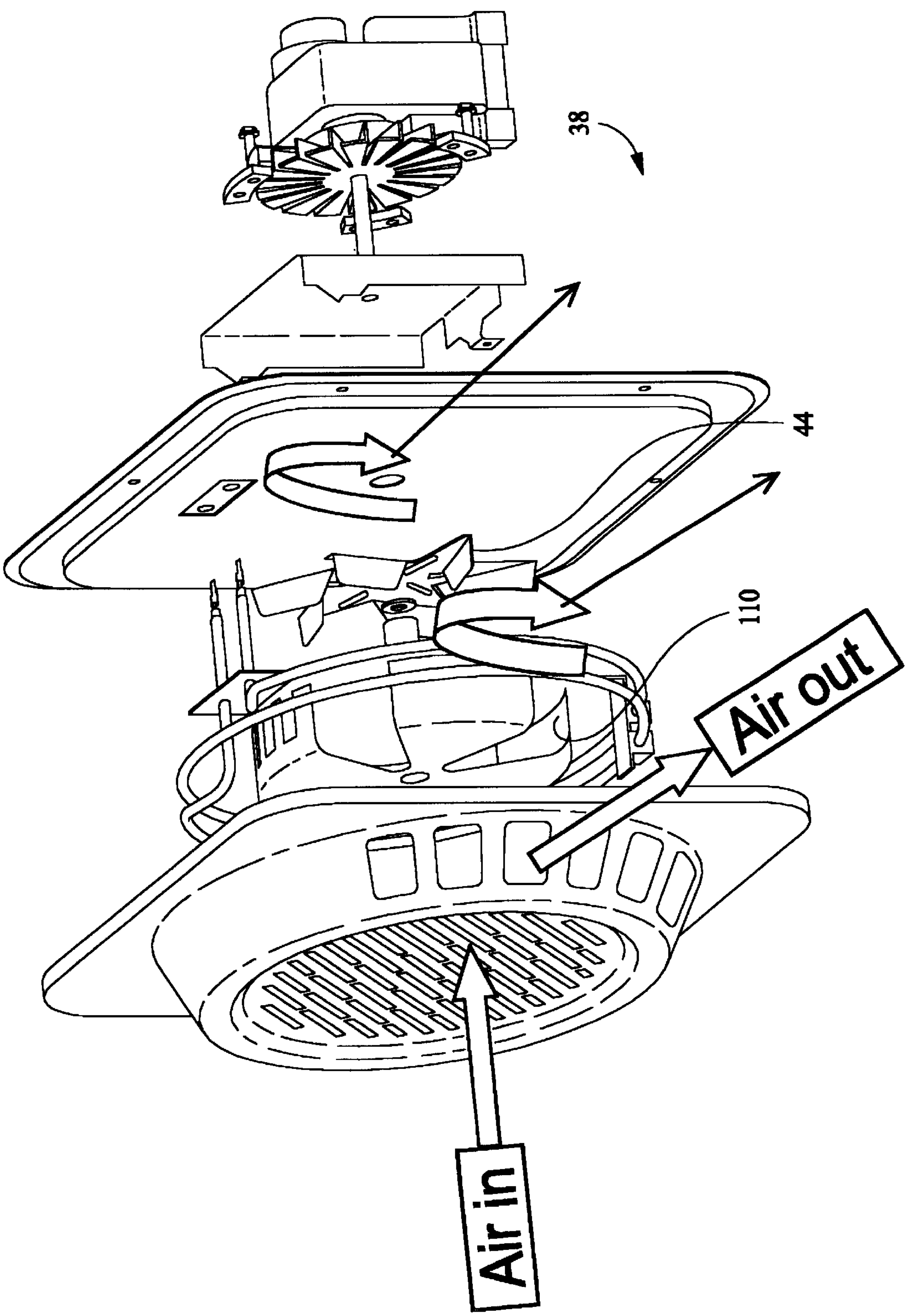
FIG. 13 is an exploded view of convection assembly shown in FIG. 2 with the blocking fan shown in FIG. 12 included.

FIG. 12 is a perspective view of a blocking fan 110 and FIG. 13 is an exploded view of convection assembly 38 with blocking fan 110 included. Blocking fan 110 includes a central portion 112 and a plurality of support members 114 extending from central portion to a plurality of arcuate fan sections 116. Each arcuate fan section 116 includes at least one vane 118 defining a vane angle 120. Although illustrated with four fan sections 116, in other embodiments, fan 110 has more than and less than four fan sections 116.

During operation of fan 44 in a single direction or any single direction fan, blocking fan 110 rotates to dynamically change the air flow inside cavity 24 as explained with respect to blocking fan 90. This dynamic changing of the airflow within cavity 24 facilitates an evenness of cooking with oven 10.

Accordingly, a reliable cost-efficient oven is provided that provides an evenness in cooking. The evenness is achieved when both a single rack is used and when multiple racks are used to cook food. Additionally, a dynamic airflow is achieved with a single fan motor. In one embodiment, the dynamic air flow is made by reversing the direction of the motor, and, in another embodiment, the dynamic air flow is made with a blocking fan aerodynamically coupled to a single direction fan.

While the invention has been described in terms of various specific embodiments, those skilled in the art will recognize that the invention can be practiced with modification within the spirit and scope of the claims.

What is claimed is:

1. An oven comprising:
   - an oven cavity;
   - at least one heat source for supplying energy to said cavity; and
   - an oven controller operationally coupled to said at least one heat source, said oven controller configured to:
     - accept data regarding a number of racks;
     - control said at least one heat source based upon the accepted data;
     - receive a cook type, including a convection bake and a convection roast; and
     - control said at least one heat source based on the received cook type.

2. An oven in accordance with claim 1 wherein to accept data regarding a number of racks, said oven controller is further configured to accept an indication of a number of racks including an indication of a single rack and an indication of multiple racks.

3. An oven in accordance with claim 2 wherein said at least one heat source comprises a bake element, a broiler element, and a convection heating element, said oven controller is further configured to:
   - energize said convection heating element when the accepted indication is an indication of multiple racks; and
   - energize at least one of said broiler element and said bake element when the accepted indication is an indication of a single rack.

4. An oven in accordance with claim 2 wherein said at least one heat source comprises a bake element, a broiler element, and a convection heating element, said oven controller is further configured to:
   - energize said convection heating element when the accepted indication is an indication of multiple racks; and
   - energize said broiler element and said bake element when the accepted indication is an indication of a single rack.

5. An oven in accordance with claim 2 wherein said oven controller is further configured to:
   - receive an indication of a desired cooking temperature;
   - maintain a first degree range about the received temperature when the received indication of number of racks is an indication of multiple racks; and
   - maintain a second degree range different from the first degree range about the received temperature when the received indication of number of racks is an indication of a single rack.

6. An oven in accordance with claim 5 wherein the first degree range is approximately 5 degrees, and the second degree range is approximately 15 degrees.

7. An oven in accordance with claim 1 further comprising a fan, said oven controller is configured to control said fan based upon the accepted indication of number of racks.

8. An oven in accordance with claim 1 wherein to accept data regarding a number of racks, said oven controller is further configured to receive an indication of a number of racks from a user.

9. An oven comprising:

an oven cavity;

a fan for circulating air within said cavity;

at least one heat source for supplying energy to said cavity; and an oven controller operationally coupled to said heat source and said fan, said oven controller configured to:

accept an indication of a number of racks including an indication of a single rack and an indication of multiple racks;

de-energize said fan after energizing said fan for a first duration of time when the accepted indication is an indication of a single rack; and de-energize said fan after energizing said fan for a second duration of time different from the first duration of time when the accepted indication is an indication of multiple racks.

10. An oven comprising:

an oven cavity;

at least one heat source for supplying energy to said cavity;

at least one fan assembly for circulating air in said cavity, said fan assembly comprising a fan motor, a shaft extending from said motor, and a fan coupled to said shaft; and an oven controller operationally coupled to said fan motor and said at least one heat source, said oven controller configured to:

energize said fan motor during a cook cycle;

de-energize said fan motor during the cook cycle;

re-energize said fan motor during the cook cycle;

accept data regarding a number of racks; and control energization of said at least one heat source based upon the accepted data.

11. An oven in accordance with claim 10, wherein said oven controller is further configured to energize said fan motor during a cook cycle for a pre-determined first time period.

12. An oven in accordance with claim 11, wherein said oven controller is further configured to de-energize said fan motor during the cook cycle for a pre-determined second time period different from the first time period.

13. An oven in accordance with claim 12, wherein said oven controller is further configured to re-energize said fan motor during the cook cycle for a pre-determined third time period different from the first and second time periods.

14. An oven in accordance with claim 10 wherein said at least one heat source comprises a bake element, a broiler element, and a convection heating element, and wherein to accept data regarding a number of racks, said oven controller is further configured to:

accept an indication of a number of racks including an indication of a single rack and an indication of multiple racks;

energize said convection heating element when the accepted indication is an indication of multiple racks; and energize at least one of said broiler element and said bake element when the accepted indication is an indication of a single rack.

15. A method for controlling at least one heat source of an oven, said method comprising:

receiving data regarding a number of racks;

energizing a convection heating element when the received data is an indication of multiple racks; and energizing a broiler element and a bake element when the received data is an indication of a single rack.

16. A method in accordance with claim 15 wherein said receiving data comprises receiving at least one of an indication of a single rack and an indication of multiple racks.

17. A method in accordance with claim 15 further comprising:

energizing a fan during a cook cycle;

de-energizing a fan during the cook cycle; and re-energizing a fan during the cook cycle.

* * * * *